United States Patent
Filsfils et al.

(10) Patent No.: US 7,855,953 B2
(45) Date of Patent: Dec. 21, 2010

(54) METHOD AND APPARATUS FOR MANAGING FORWARDING OF DATA IN AN AUTONOMOUS SYSTEM

(75) Inventors: Clarence Filsfils, Brussels (BE); John Galen Scudder, Ann Arbor, MI (US); Stefano B. Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 844 days.

(21) Appl. No.: 11/254,468

(22) Filed: Oct. 20, 2005

(65) Prior Publication Data

US 2007/0091793 A1   Apr. 26, 2007

(51) Int. Cl.
*H04L 12/26* (2006.01)
(52) U.S. Cl. .................. 370/228; 370/254; 709/238
(58) Field of Classification Search ................ 370/225, 370/227, 228, 216, 217, 351, 352, 254, 238, 370/389, 392; 709/238
See application file for complete search history.

(56) References Cited

U.S. PATENT DOCUMENTS

| | | | |
|---|---|---|---|
| 5,781,549 | A | 7/1998 | Dai |
| 6,144,638 | A | 11/2000 | Obenhuber et al. |
| 6,415,312 | B1 | 7/2002 | Boivie |
| 6,463,061 | B1 | 10/2002 | Rekhter et al. |
| 6,711,152 | B1 * | 3/2004 | Kalmanek et al. ............ 370/351 |
| 6,778,492 | B2 | 8/2004 | Charny et al. |
| 6,829,221 | B1 | 12/2004 | Winckles et al. |
| 7,036,051 | B1 | 4/2006 | Fernandes |
| 7,123,587 | B1 | 10/2006 | Hass et al. |
| 2002/0032029 | A1 * | 3/2002 | Angin ........................ 455/428 |
| 2002/0093954 | A1 | 7/2002 | Weil et al. |
| 2002/0150041 | A1 | 10/2002 | Reinshmidt et al. |
| 2002/0163882 | A1 * | 11/2002 | Bornstein et al. ........... 370/227 |
| 2002/0172155 | A1 * | 11/2002 | Kasvand-Harris et al. ... 370/229 |
| 2003/0007500 | A1 | 1/2003 | Rombeaut et al. |
| 2003/0012145 | A1 | 1/2003 | Bragg |
| 2003/0063613 | A1 * | 4/2003 | Carpini et al. .............. 370/401 |
| 2003/0088698 | A1 | 5/2003 | Singh et al. |
| 2003/0097643 | A1 * | 5/2003 | Saito ............................. 716/1 |
| 2003/0110288 | A1 | 6/2003 | Ramanujan et al. |
| 2003/0112809 | A1 | 6/2003 | Bharali et al. |

(Continued)

OTHER PUBLICATIONS

Rosen, E., et al., "BGP/MPLS VPNs", Network Working Group Request for Comments: 2547, Mar. 1999, pp. 1-24.

(Continued)

*Primary Examiner*—Ricky Ngo
*Assistant Examiner*—Gary Mui
(74) *Attorney, Agent, or Firm*—Cesari and McKenna, LLP

(57) ABSTRACT

A method of managing forwarding of data in a first autonomous system (AS) is described. The first AS includes a plurality of border routers having inter-domain links to one or more remote AS's and an associated exterior communications protocol. The border routers use an interior communications protocol with other border routers in the first AS using primary tunnels. The method comprises the steps, performed at a first border router having a primary route via an inter-domain link to a remote AS, of constructing an alternate route to the remote AS via second border router in the first AS, instigating a backup tunnel to the second border router upon failure of the primary route and sending a failure message to the other border routers.

17 Claims, 9 Drawing Sheets

U.S. PATENT DOCUMENTS

| | | | |
|---|---|---|---|
| 2003/0152027 | A1 | 8/2003 | Takagi |
| 2003/0233595 | A1 | 12/2003 | Charny et al. |
| 2004/0034702 | A1 | 2/2004 | He |
| 2004/0090913 | A1 | 5/2004 | Scudder et al. |
| 2004/0156310 | A1 | 8/2004 | Fredette et al. |
| 2005/0007954 | A1 | 1/2005 | Sreemanthula et al. |
| 2005/0097219 | A1 | 5/2005 | Goguen et al. |
| 2005/0152269 | A1* | 7/2005 | Liu .............................. 370/225 |
| 2006/0067210 | A1 | 3/2006 | Liu et al. |
| 2006/0159076 | A1 | 7/2006 | Bless et al. |
| 2006/0165009 | A1 | 7/2006 | Nguyen et al. |
| 2006/0200579 | A1* | 9/2006 | Vasseur et al. .............. 709/238 |
| 2006/0274718 | A1* | 12/2006 | Butenweg et al. ........... 370/351 |
| 2007/0053284 | A1 | 3/2007 | Hu |

OTHER PUBLICATIONS

Gummadi, K. P., et al., "Improving the Reliability of Internet Paths with One-hop Source Routing", USENIX Association, OSDI '04: 6th Symposium on Operating Systems Design and Implementation, Dec. 6-8, 2004, pp. 183-197.

"Fast Scoped Rerouting for BGP", International Conference on Networks, IEEE, Sep. 2003, pp. 25-30.

Lichtwald, et al., "Fast Scoped Rerouting for BGP", ICON 2003, Institute of Telematics, University of Karlsruhe, Germany, pp. 1-15.

Walton, D., et al., "Advertisement of Multiple Paths in BGP (draft-walton-bgp-add-paths-03.txt)", Network Working Group Internet Draft, Jul. 2005, pp. 1-8.

U.S. Appl. No. 11/254,469, filed Oct. 20, 2005, entitled A Method for Constructing a Backup Path in an Autonomous System, by Clarence Filsfils, et al.

U.S. Appl. No. 11/254,609, filed Oct. 20, 2005, entitled A Method of Implementing a Backup Path in an Autonomous System, by Clarence Filsfils, et al.

U.S. Appl. No. 11/254,587, filed Oct. 20, 2005, entitled A Method for Constructing a Backup Path in an Autonomous System, by Olivier Bonaventure, et al.

U.S. Appl. No. 10/340,371, filed Jan. 9, 2003, entitled Method and Apparatus for Constructing a Backup Route in a Data Communications Network, by Kevin George Miles, et al.

PCT Notification of Transmittal of the International Search Report and the Written Opinion of the International Searching Authority, or the Declaration, International Application No. PCT/US06/40929, International Filing Date: Oct. 18, 2006, Date of Mailing: Jul. 16, 2007, 9 pgs.

* cited by examiner

METHOD AND APPARATUS FOR MANAGING FORWARDING OF DATA IN AN AUTONOMOUS SYSTEM

RELATED APPLICATIONS

This application is related to U.S. patent application Ser. No. 11/254,469, entitled A METHOD OF CONSTRUCTING A BACKUP PATH IN AN AUTONOMOUS SYSTEM, filed Oct. 20, 2005, by Clarence Filsfils et al.

This application is related to U.S. patent application Ser. No. 11/254,609, entitled A METHOD OF IMPLEMENTING A BACKUP PATH IN AN AUTONOMOUS SYSTEM, filed Oct. 20, 2005, by Clarence Filsfils et al.

This application is related to U.S. patent application Ser. No. 11/254,587, entitled A METHOD FOR CONSTRUCTING A BACKUP PATH IN AN AUTONOMOUS SYSTEM, filed Oct. 20, 2005, by Olivier Bonaventure et al.

FIELD OF THE INVENTION

The invention relates to a method of managing forwarding of data in an autonomous system.

BACKGROUND OF THE INVENTION

The approaches described in this section could be pursued, but are not necessarily approaches that have been previously conceived of pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

One routing protocol used, for example, in the internet is Border Gateway Protocol (BGP). BGP is used to route data between autonomous systems (AS) comprising networks under a common administrator and sharing a common routing policy. BGP routers exchange full routing information during a connection session for example using Transmission Control Protocol (TCP) allowing inter-autonomous system routing. The information exchanged includes various attributes including a next-hop attribute. For example where a BGP router advertises a connection to a network, for example in a form of an IP address prefix, the next-hop attribute comprises the IP address used to reach the BGP router.

Edge or border BGP routers in a first AS communicate with eBGP peers in a second AS via exterior BGP (eBGP). In addition BGP routers within an AS exchange reachability information using interior BGP (iBGP). As a very large number of routes may be advertised in this manner an additional network component comprising a route reflector is commonly provided which sets up a session with each BGP router and distributes reachability information to each other BGP router.

The border routers in respective AS's can advertise to one another, using eBGP, the prefixes (network destinations) reachable from them, the advertisements carrying information such as AS-path, indicating the AS's through which the route advertisement has passed including the AS in which the advertising border router itself is located, and a BGP Community attribute indicating the manner in which the advertisement is to be propagated. For example if an eBGP advertisement is received with Community attribute No-Advertise, then the border router receiving the advertisement does not advertise the route information to any of its peers, including other routers in its AS. When the routes are advertised internally, additional information such as a local preference and a nexthop field are included. The local preference attribute sets a preference value to use of that particular route for example for a given set of prefixes such that where more than one route is available to other border routers in the AS they will select the route with the highest local preference. The next-hop attribute provides the IP address used for the link between the border router in the AS and its eBGP peer. To reduce the amount of iBGP messages further, route reflectors may only advertise the best path for a given destination to all border routers in an AS. Accordingly all border routers will forward traffic for a given destination to the border router identified in the best path advertisement. Forwarding of packets within the AS may then simply use Interior Gateway Protocol (IGP) as described in more detail below where the IGP forwarding table will ensure that packets destined for the eventual destination will be forwarded within the AS towards the appropriate border router. Alternatively an ingress border router receiving incoming packets may tunnel the packets to the appropriate egress border router, that is, encapsulate the packets to a destination egress border router for example using IP or MPLS tunnels. The packets are then decapsulated at the egress border router and forwarded according to the packet destination header.

BGP is capable of supporting multiple address types for example internet protocol version 4 (IPv4), internet protocol version 6 (IPv6) and so forth, and each type of address is identified using an address family identifier (AFI) and a subsequent address family identifier (SAFI). The destinations reachable via a BGP route, for example the network components whose IP addresses are represented by one IP prefix, are referred to as the network layer reachability information (NLRI) in BGP.

One implementation of VPNs in BGP is BGP/MPLS VPN which will be well known to the skilled reader and is described at, for example, "BGP/MPLS VPN" in the file "rfc2547.txt" of the directory "rfc" in the domain "ietf org" of the World Wide Web, the entire contents of which are incorporated herein by reference as fully disclosed. In summary MPLS is used for forwarding the VPN packets between VPN sites and BGP is used for distributing VPN routes between the VPN sites.

Within each AS the routing protocol typically comprises an interior gateway protocol (IGP) for example a link state protocol such as open shortest path first (OSPF) or intermediate system-intermediate system (IS-IS).

The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB), which is a map of the entire network topology, and from that constructs generally a single optimum route to each available node based on an appropriate algorithm such as, for example, a shortest path first (SPF) algorithm. As a result a "spanning tree" (SPT) is constructed, rooted at the node and showing an optimum path including intermediate nodes to each available destination node. The results of the SPF are stored in a routing information base (RIB) and based on these results the forwarding information base (FIB) or forwarding table is updated to control forwarding of packets appropriately. When there is a network change an LSP representing the change is flooded through the network by each node adjacent the change, each node receiving the LSP sending it to each adjacent node.

As a result, when a data packet for a destination node arrives at a node the node identifies the optimum route to that destination and forwards the packet to the next node along that route. The next node repeats this step and so forth.

It is important to minimize packet loss in the case of network component failure, both intra-domain (eg IGP) and inter-domain (eg BGP). For example in the case of intra domain link failure ISP's use various techniques to react quickly to the failure while convergence is taking place including handling of the failures by other layers or implementing fast reroute techniques for example of the type described in co-pending patent application Ser. No. 10/340,371, filed 9 Jan. 2003, entitled "Method and Apparatus for Constructing a Backup Route in a Data Communications Network" of Kevin Miles et al., ("Miles et al."), the entire contents of which are incorporated by reference for all purposes as if fully set forth herein.

In the case of inter-domain failure, for example failure of peering links between AS's or, in the case of BGP/MPLS VPN a link between a BGP/MPLS VPN service provider and a customer site, convergence can take several seconds. Typically, in these circumstances, a BGP router attached to a failed eBGP peering link advertises a new LSP without the destinations served by the failed link together with an iBGP withdraw message indicating that the destinations are not reachable. Approaches have been suggested for reducing the BGP convergence time in case of failures by reducing the number of BGP messages exchanged after a failure. In addition proposals to implement source routing techniques have been made by Gummadi et al in "Improving the reliability of Internet paths with One-hop Source Routing", USENIX OSDI'04, 2004. However these techniques still have an unacceptably long recovery time. A further proposed technique is described in "Fast Scoped Rerouting for BGP", in International Conference on Networks, pages 25-30, IEEE, September 2003 requiring BGP routers to find an alternate path for a destination after a failure as a result of which recovery time is still long.

BRIEF DESCRIPTION OF THE DRAWINGS

The present invention is illustrated by way of example, and not by way of limitation, in the figures of the accompanying drawings and in which like reference numeral refer to similar elements and in which.

DETAILED DESCRIPTION OF THE PREFERRED EMBODIMENT

A method and apparatus for managing forwarding of data in an autonomous system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Managing Forwarding of Data in an Autonomous System
4.0 Implementation Mechanisms-Hardware Overview
5.0 Extensions and Alternative 1.0 GENERAL OVERVIEW The needs identified in the foregoing Background, and other needs and objects that will become apparent for the following description, are achieved in the present invention, which comprises, in one aspect, a method of managing forwarding of data in a first autonomous system (AS) including a plurality of border routers. The border routers have inter-domain links to one or more remote AS's and an associated exterior communications protocol. The border routers use an interior communications protocol with other border routers in the first AS using primary tunnels. The method comprises the steps, performed at a first border router having a primary route via an inter-domain link to a remote AS, of constructing an alternate route to the remote AS via a second border router in the first AS, instigating a backup tunnel to the second border router upon failure of the primary route and sending a failure message to the other border routers.

In other aspects, the invention encompasses a computer apparatus and a computer-readable medium configured to carry out the foregoing steps.

2.0 STRUCTURAL AND FUNCTIONAL OVERVIEW

Figure 1:
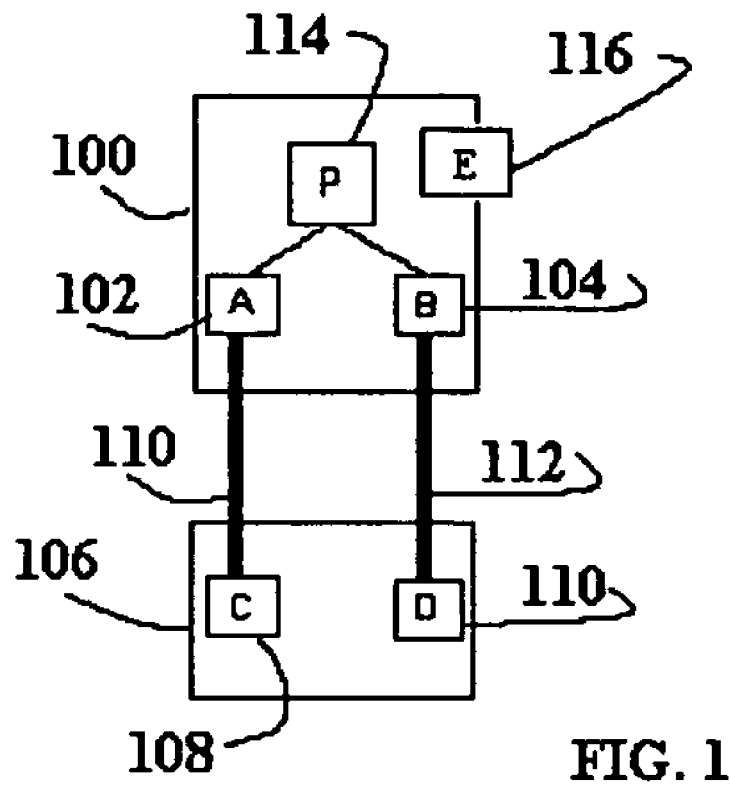
FIG. 1 is a representation of a first multiple domain network to which the method is applied.

In overview a method of constructing a BGP backup path/repair route can be understood with reference to FIG. 1 which depicts a network to which the method may be applied. The network includes a first AS, AS1, reference numeral 100 including edge routers 102, 104 shown as router A, router B respectively and a second AS, AS2 reference numeral 106 including edge routers 108, 110, termed routers C and D respectively. A first inter-domain link 110 connects routers A and C and a second inter-domain link 112 connects routers B and D.

In the case, for example, of AS1, each edge router A, B pre-computes a protection tunnel to an alternate nexthop which can reach the same AS as via a protected link. For example where router A wishes to protect link 110 to router C it identifies alternate backup paths to the same AS as served by that link, for example via router B in AS1 and D in AS2 over second inter-domain link 112, as alternate nexthop. In the case of failure of link 110, therefore, router A tunnels packets that would have been sent over the protected link in a protection tunnel to router B, and they are decapsulated and forwarded at router B via link 112 to router D in AS2.

The alternate inter-domain links can be auto discovered as described in more detail below and, where multiple candidate backup paths are available, an optimum one can be automatically selected. The approach may be applied for various topologies including links between large transit ISP's as well as links between multi-homed stub networks and providers. The tunnels can furthermore be deactivated following convergence using various techniques. The provision of the pre-computed backup path allows packets to be sent to a final destination without using a failed link with simple modification to the FIB and at very high speed.

In particular a method is provided for removing backup paths once convergence has taken place in a first autonomous system including a plurality of border routers communicating with remote AS's via inter-domain links using an associated exterior communications protocol such as eBGP. Where the border routers in the first autonomous system communicate via an interior communications protocol using primary IGP tunnels, for example MPLS or IP tunnels, a first border router in the first AS can construct an alternate route to a remote AS via a second border router in the first AS by instigating a back up tunnel to the second border router upon failure of the primary route to the remote AS. The first border router then sends a failure message in the form for example of a BGP withdraw message to the other border routers. As a result once a third border router in the first AS receives the BGP withdraw message then it can tunnel to the second border router using a backup path for example distributed over iBGP, for example using IGP tunneling such that looping does not take place within the first AS. Router A can then withdraw its own backup tunnel upon expiry of a timer set to allow normal BGP convergence to occur such that, subsequently, all border routers will forward traffic for the remote AS to the second border router in normal operation.

2.0 METHOD OF APPARATUS FOR MANAGING FORWARDING OF DATA IN AN AUTONOMOUS SYSTEM

The method described herein can be implemented in relation to various inter domain link protection schemes, for example the parallel link scheme shown in FIG. 1 which is common between transit ISP's where redundancy is provided. In addition, connections of this kind may appear in BGP/MPLS VPN's in which nodes C and D comprise customer edge (CE) routers, nodes A and B comprise provider edge (PE) routers for an additional provider node P, reference number 114. In this case, once again, redundancy is provided in case of failure of either of the inter domain links.

In this case, in order to provide link protection, where router A is considered the primary egress router in AS1 and router C the primary ingress router in AS2, in an optimization a protection tunnel is created from the primary egress router to another egress router in AS1 that peers with AS2 providing an alternate inter AS link, ie router B termed here a secondary egress router, forming a pe-se (primary egress-secondary egress) tunnel. The manner of identification and construction of the routers is described in more detail below but it will be seen that, because of the provision of a pe-se tunnel, co-operation between eBGP peers (ie different AS's) is not required which is significant as in many cases this requires commercial negotiation to set up appropriate agreements.

Figure 2:
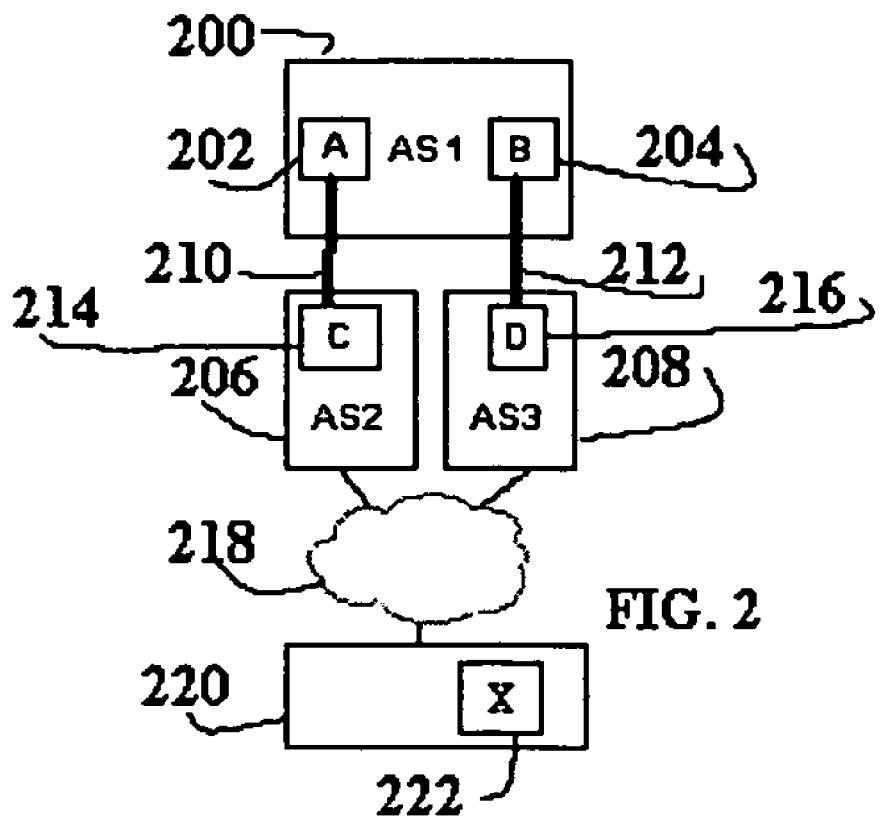
FIG. 2 is a representation of a second multiple domain network to which the method is applied.

FIG. 2 is a network diagram illustrating an alternative configuration to that shown in FIG. 1. ISP AS1, reference number 200, has a single peering link with each of respective AS's AS2, reference numeral 206, and AS3, reference number 208, via respective links 210, 212 between border routers A and B, reference numerals 202, 204 respectively in AS1 and border routers C and D, reference numerals 214, 216 respectively in AS2 and AS3. Where AS2 and AS3 communicate with a destination or set of destinations shown generally as 220 via a network such as the Internet 218 it will be seen that for those destinations AS1 has multiple path possibilities such that, once again, potential protection routes or backup paths are available.

In the case of FIG. 1 or FIG. 2, in order to configure appropriate protection tunnels, for example pe-se protection tunnels, one possibility is to merely configure them but a scalability issue arises. Accordingly, in an optimization, an auto discovery mechanism is introduced to simplify configuration and automatically adapt protection tunnels to topology changes. In particular the primary egress router must automatically determine the IP address of an appropriate secondary egress router as well as, for example, the tunnel type to be used.

Referring once again to a network of the type shown in FIG. 1, where it is assumed that the same destinations are advertised by the downstream AS2 over both links 110, 112, and treating router A as the primary egress router, router A must first locate the appropriate secondary egress router. It will be seen in FIG. 1 that only one additional router is provided but, of course, in practice an AS will typically include a large number of border routers many of which will not provide an alternate protection route for a given remote AS.

In order to accommodate pre-computation of a protection route, each border router in AS1 advertises via iBGP existing eBGP sessions to which it is party. In particular the protection route characteristics advertised include NLRI, the local IP address on the peering link with the downstream AS, the AS-path attribute, indicating downstream AS together with a tunnel attribute containing the parameters of the protection tunnel to be established. For example the advertisement from node B includes the IP address of the link 112 to AS2, AS2 as its AS-path attribute together with an appropriate tunnel attribute indicating the supported type of tunnel.

It will be noted that it is not sufficient to rely on normal iBGP notifications as in this case node B may only advertise its best route to AS2 as via node A. As a result, in particular it is necessary to force a border router to advertise possible protection routes.

In one optimization routers utilize Virtual Private Network version 4 (VPNv4) for advertising back up routes in an AS. Each router in the AS originates one or more unique VPNv4 routes (using a route-distinguisher RD). For example, router B originates a route whose NLRI is router B's address on link 112 to router D in AS2 and with an appropriate RD. Of course if B has multiple links then multiple such routes are advertised and identified by appropriate RD. Node B additionally identifies AS2 as its AS-path indicating that it offers a backup path to peer AS2 and the appropriate nexthop interface which may be, for example, a loop back address. In addition router B sets values of a peer-policy (i.e. agreed parameters with the downstream AS), a link bandwidth, a shared risk link group (SRLG) and a priority in accordance with the characteristics of link 112. As a result the route advertisement carries information identifying the possible back up routes provided by router B via the AS path information together with requisite forwarding information comprising the nexthop information. In addition the advertisement carries further information allowing a receiving router to select an appropriate tunnel if multiple tunnels are available either from a single router where a router provides multiple peering links, or between multiple routers each with one or more peering links as described in more detail below.

Figure 3:
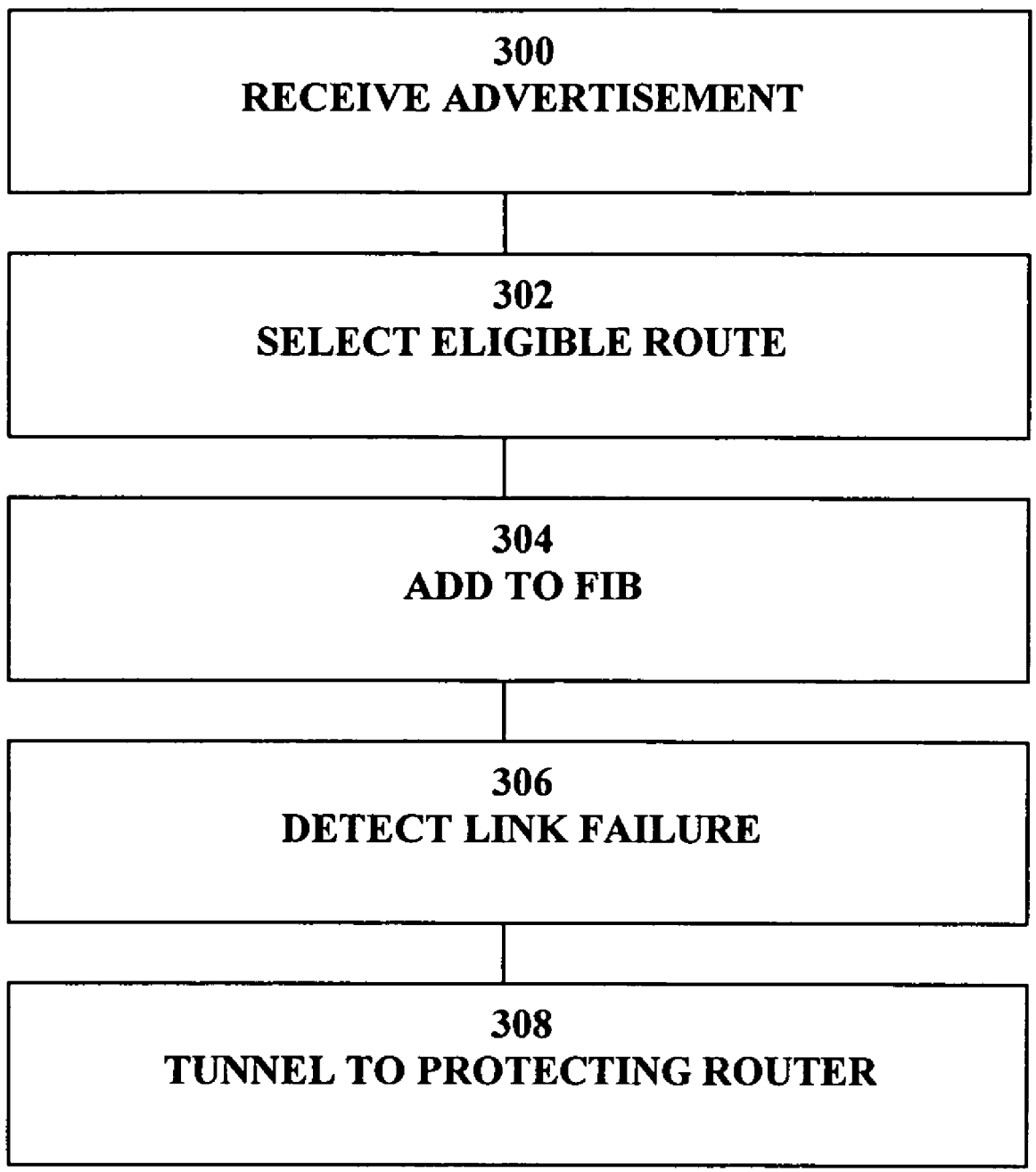
FIG. 3 is a flow diagram illustrating steps performed in implementing a backup path.

The auto-discovery process can be further understood with reference to FIG. 3 which is a flow diagram illustrating additional steps performed at an auto-discovering router such as router A in FIG. 1. At step 300 router A receives a protection route advertisement for example a VPNv4 route and at step 302 an eligible route is selected as described in more detail below with reference to FIG. 4.

It will be noted that the selection process can also accommodate traffic engineered pe-se tunnels for example incorporating a traffic engineered MPLS tunnel with bandwidth reservations between a primary and secondary egress routers by using RSVP-TE ensuring that sufficient bandwidth will be available for the protected traffic.

At step 304 router A adds the selected backup route to its FIB. At the primary egress router, a protection tunnel is ultimately defined by two parameters, an encapsulation header and an outgoing interface. In addition the protection entry for link AC, 110, may have the semantic "encapsulate (tunnel) with destination address equals nexthop of the chosen backup route, source address equals address of the interface provided in the BGP-protect primary configuration" and as described in more detail below, enabling "forwarding-helper" in the chosen back up route.

Figure 5:
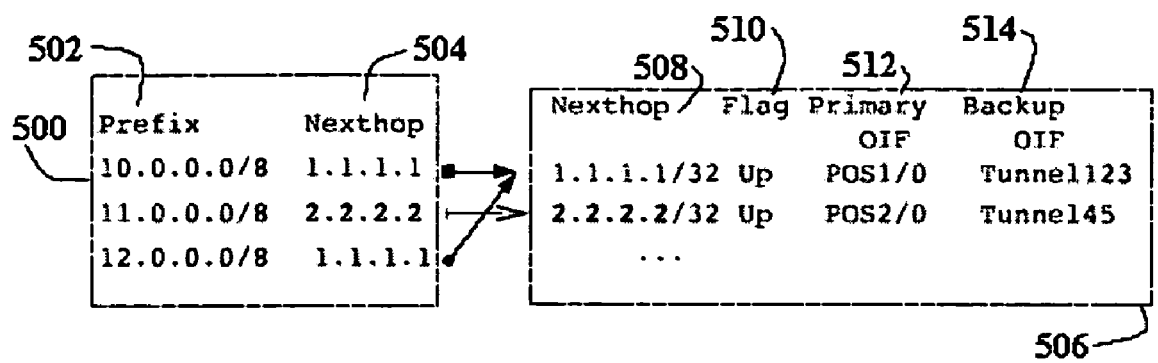
FIG. 5 is a schematic diagram showing an FIB structure according to the present method.

In an optimization the FIB is organized as two tables as shown in FIG. 5. A first table 500 contains the BGP prefixes (ie IP destinations served via a certain route) and the BGP nexthop (i.e. the next BGP router to which packets for those destinations are routed). The BGP nexthops 504 comprise pointers to a table 506 of all nexthop entries, comprising part of the IGP table. Each nexthop entry in the second table 506 contains the address of the nexthop 508, a flag 510 that indicates whether the link to the nexthop is up or down and two outgoing interfaces (OIF): a primary OIF 512 and a secondary OIF 514, each comprising a data structure containing all information required to forward packets on this interface according to the interface type and protocol used. As described in more detail below, this organization reduces the number of FIB entries that must be modified after the activation of a protection tunnel hence increasing the speed of reroute.

Reverting to FIG. 3, at step 306 failure of the protected link 110 is monitored and detected in any appropriate manner for example using a trigger from the physical layer such as a SONET loss of signal. At step 308, upon detection of failure, the detecting router immediately updates its FIB to encapsulate the packets that were using the failed link and send them to the alternate nexthop. In particular, in those circumstances, router A sets the flag on the primary OIF to down as a result of which the backup tunnel is implemented using the information in the secondary OIF data structure. Then at step 310 the packets are tunneled to the back up nexthop i.e. router B.

Figure 4:
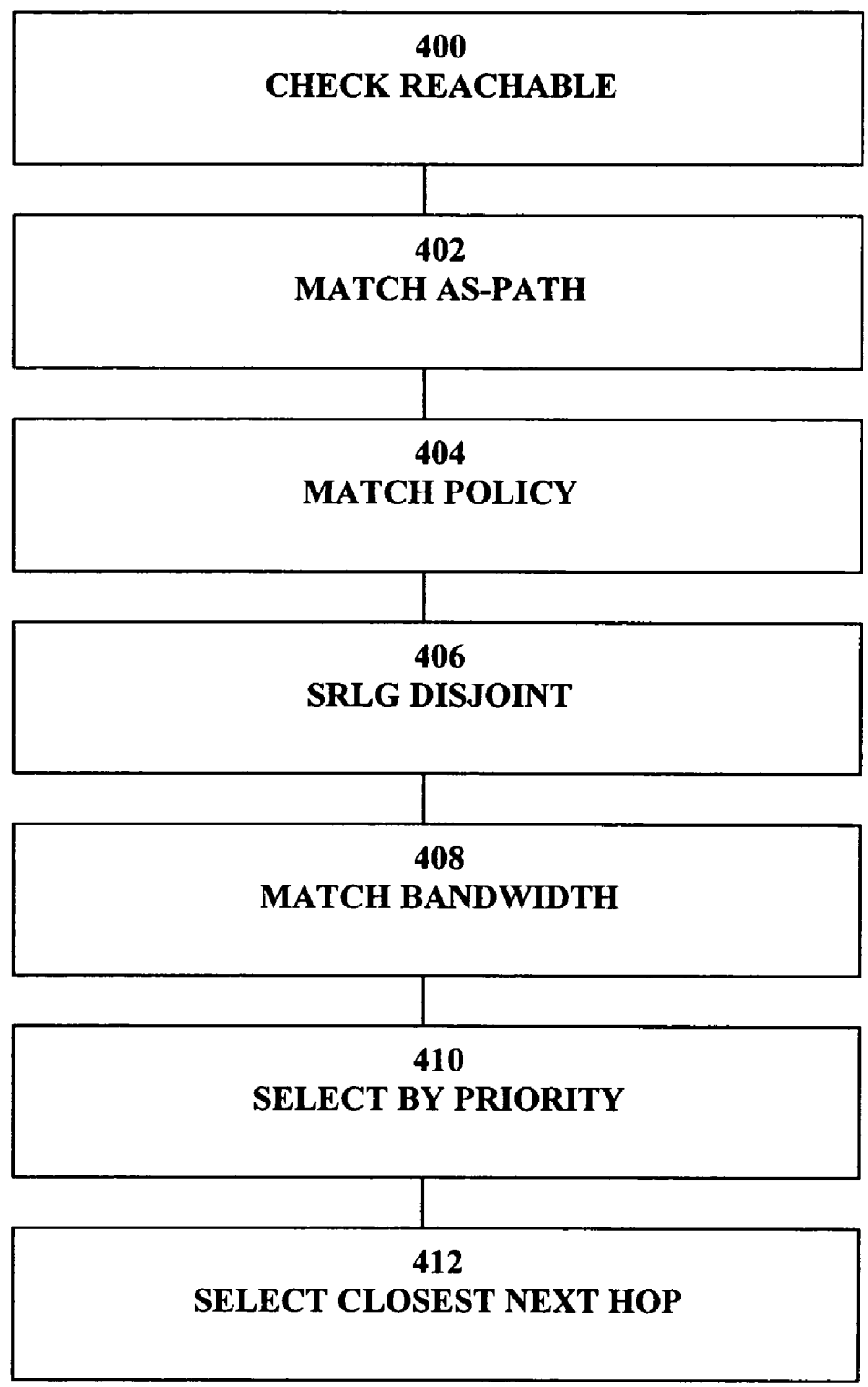
FIG. 4 is a flow diagram illustrating steps performed in selecting a backup path.

FIG. 4 is a flow diagram illustrating the route selection mechanism at step 302 of FIG. 3. At step 400 router A checks whether the backup route is reachable according to its IGP table. At step 402 router A selects a pe-se tunnel end point for protecting its primary inter domain link 110 from secondary egress routers offering secondary inter domain links as protection routes whose AS-path value is eligible.

At step 404 the policy advertised by router B must correspond to the policy implemented at router A, for example in the form of an equality to or superset thereof As a result, if different BGP policies are used over the parallel links any such differences are identified. For example the policy identifier can include customer and peer information requiring configuration of each egress router with the BGP policy used by its peer which may be exchanged as an eBGP session type during establishment of the BGP session.

At step 406 the router checks the SRLG value. In the case of the SRLG attribute, the SRLG of the back up route should be disjoint with that of the primary backup route. If both routes are in a common shared risk group then, by definition, if one fails there is a risk that the other will have failed as well. The SRLG values can also be exchanged over the eBGP session.

At step 408 the bandwidth of the backup route should be greater than or equal to the bandwidth of the primary link in order that appropriate data traffic support can be maintained. At step 408, where a priority field is incorporated similar, for example, to a local preference field, then where all other attributes match, the highest priority is then selected. If the priorities also match then at step 412 the closest next-hop is chosen using IGP path costs as selection metric. The backup path is thus selected. As a result, in the event of failure of link 110 router A has an immediate alternate link 112 which provides the same reachability.

When router A implements its backup route, upon receipt of the tunneled packet at router B it is necessary to ensure that the packet is not simply routed back to router A which router B may still have as the appropriate nexthop for the decapsulated packet destination according to its FIB. Accordingly it is necessary to override a normal address look up at a border router when a repaired packet is received there. Accordingly the tunneling mechanism or header implemented at router A for protected packets indicates that the payload comes from a BGP protection for example by setting a bit called here a "P-bit" although any appropriate nomenclature may be adopted. When a router decapsulates a payload and the tunnel header has the P-bit set, the router will associate the set P-bit with the payload so that the packet cannot be protected a second time, enabling loop prevention. For example, referring to FIG. 1, treating routers C and D as a single node "CD", if CD fails then both routers A and B in AS1 would protect their respective link traffic by forwarding to the other of router A and B, setting up the loop. This cannot occur if the P-bit is set upon the first repair attempt as the second router will not attempt to re-repair the packet but may, for example, discard the packet if it detects that a second repair is required. The P-bit can be implemented in any appropriate manner.

In addition the decapsulating router i.e. router B at the tunnel end point in a pe-se configuration of the type discussed must be able to establish on which of its local interfaces to forward the payload. This is achieved by writing a specific "forwarding helper" field into the tunnel header at the encapsulating router to ensure that the correct forwarding decision is made at the decapsulating router. For example if the forwarding helper value is a bit set to, say, zero, the decapsulated router will forward the packet per the usual look up on the destination address of the packet in the payload. However if the forwarding helper bit is set, for example, to 1 then the decapsulating node does not perform a normal look up on the payload but instead forwards according to the backup route, in order to ensure that the protected packet is forwarded on to an exterior link. In the case of the network shown in FIG. 1, for example, if AS1's policy is to prefer paths learned via router A (for example router A has a high local preference value) then router B would, otherwise, route a repaired encapsulated packet back from router A towards A, forming a loop. However if the forwarding helper field is set in the encapsulated packet header then router B will be forced to forward a decapsulated packet onto repair link 112 to router D in AS2. Alternatively a corresponding semantic such as directed forwarding, where packets from node B to node D are effectively source routed, can be implemented. It will further be noted that the value for the forwarding helper field or bit can be advertised through the network by each router or set across the entire network either automatically or manually by the administrator.

For example where MPLS is implemented then two labels may be maintained for each local route, differing only in the value of the right most bit, which is set to zero for normal traffic and one for protected traffic. Upon failure of a link, a border router (e.g. router A) will swap the top label, with a zero bit, of incoming traffic and replace it with a top label for the back up border router (eg router B) and a bottom label with the right most bit set to 1. As a result, a simple mechanism is provided setting the P-bit and identifying whether the P-bit is set.

It will be seen that the specific mechanisms by which the steps of FIG. 4 are implemented may take any appropriate form. For example the NLRI in the advertised protection route comprising the local IP address of the backup router with the downstream AS is ultimately a unique IP address to ensure that it is distributed even in the case of route reflectors. The tunnel itself may be of any appropriate type for example Generic Routing Encapsulation (GRE), Layer 2 Tunnel Protocol (L2TP) or MPLS over IP and the protection route advertisement will indicate the appropriate tunnel attribute together with optional parameters such as the required label in the case of MPLS over IP encapsulation. Auto-discovery can be configured in any appropriate manner. For example router A can be configured with an appropriate policy on its AC (link 10) peering link interface enabling BGP protection requiring router A to monitor for potential candidate back up routes and select from the various required attributes with reference to FIG. 3. Each border router in the network will maintain a similar policy together with a policy indicating the manner in which the router should operate as a backup router including originating protection route information setting the attributes required for the selection process together with the associated destination information. In the case where VPNv4 backup paths are advertised then the destination address for the tunnel is defined as the nexthop of the backup path. It will further be noted that, as appropriate, an additional SAFI can be used to carry the protection routes allowing them to be recognized as such.

It will be seen that, with appropriate modifications, the approach described above with reference to FIGS. 3 and 4 can equally be implemented in relation to the network shown in FIG. 2, where AS1 has peering links with multiple AS's AS2, AS3 via respective nodes A, B. In that case, if router A, for example, has a primary eBGP path for a given destination or prefix set and router B discovers another path for the same prefix set then it is necessary for router A to learn the alternative path to the prefix set and store it as a backup path for its own primary path. However as different AS's may serve different prefixes, then in the configuration of FIG. 2, each router in AS1 must obtain back up routes on a prefix-dependent basis. Once again it is necessary to ensure that all available backup routes are advertised not just the best path determined in iBGP, and various mechanisms are available.

In a first implementation router B builds a VPNv4 route for each prefix received from its eBGP neighbours, regardless of whether the path is selected as best path or not, and propagates these routes in addition to normal IPv4 BGP operation. The backup routes are propagated including router B's appropriate Route Distinguisher, identifying router B as nexthop and, as the appropriate label, the link to the eBGP neighbour in the downstream AS that advertised that it has a route for the prefix. For example in the case of FIG. 2, where an eventual destination X, reference numeral 222 is available via AS3 then node D in AS3 will have advertised this route to node B which will then propagate the advertisement within AS1 using iBGP such that node A will learn about it. Router A will have its own best route to destination X via router C in AS2 but can add router B's backup path appropriately.

In a second, alternate implementation, all of the internet eBGP sessions are configured in a VPN routing and forwarding table (VRF) treating the entire network, for example the Internet as a common VPN and configuring each border router with a unique RD. The operation of VRF's will be well known to the skilled reader and is not discussed in detail here. However, in summary, the VRF includes an IP routing table and derived forwarding table used by an associated set of interfaces. Information is injected into the VRF according to appropriate routing protocols and from routing peers. The VRF is consulted if a packet arrives through an associated interface.

By treating the network as a common VPN, each border router sees all the paths for any prefix allowing it to compute the backup paths for its own primary paths. Accordingly, referring to the example shown in FIG. 2 where routers A, B, C, D are treated as belonging to a common VPN, then each router will maintain a VRF including an IP routing and forwarding table. In particular, because the VRF contains all relevant routing information for the common VPN, it is not necessary to "force" the BGP routers to forward additional backup route information as they advertise within the VPN all routes, not just best routes. So, for example in an MPLS configuration, router B advertises the routes received from router D as RD (router B): route (n), label (n). Router A receives these advertisements and checks whether the received routes match any primary routes received from peer primary inter domain link connected to router C. If so the advertised routes are logged as possible back up solutions. Furthermore when protecting link 110 to router C when that link fails, router A is able to use the label advertised by router B as an inner label on a packet encapsulated with an outer label to reach router B. Accordingly upon decapsulation of the packet, router B will forward the packed according to the inner label, i.e. along its route (via link 112, router D) to the destination. As a result a per-prefix solution is provided without "forcing" BGP routers to advertise additional, non best-path routes.

In an alternate, third implementation, each router in an AS identifies candidate back up routes advertised as an "additional path" in iBGP. In that case each router advertises multiple available paths for each destination rather than just its best path. The multiple paths are propagated and, for example, distributed by the route reflector. In that case the alternative or next-best paths can be reflected in any appropriate manner, for example all possible paths to all prefixes or at least one alternative path to each prefix where available. For example referring to FIG. 2, router B's best path to destination X may be via router A but its next-best path will be via router D. As a result, when the additional paths are propagated, router A will recognize that router B offers an alternate route to destination X which it can then enter into its forwarding table as a backup route in the event of failure of link AC. For example this approach may be implemented using the ADD-PATH function techniques described in "Advertisement of Multiple Paths in BGP" which is available at the time of writing on the file "draft-walton-bgp-add-paths-03.txt" in the directory "internet-draft" of the domain "ietf.org" of the World Wide Web the entirety of which is incorporated by reference for all purposes as if fully described herein.

In a fourth alternate implementation, each BGP router advertises its best external path per prefix. That is to say, a router, in addition to its best path to an external destination, which may be to another border router in the same AS advertises at least one path for which it can act itself as a BGP route to the destination via a link to a downstream AS. For example in the example of FIG. 2, router B's best path to destination X may be via router A which will then forward via BGP to router C. However router B will additionally identify that it has its own external path to destination X (i.e. via router D) and advertise this as its own best external path as well. As a result, when router A receives the advertisement from or on behalf of router B it will recognize that router B provides an alternate back up external path which it can add to its forwarding calculation as appropriate.

According to a fifth alternate implementation a route server can be incorporated in addition to the normal iBGP transport mechanism to distribute backup paths. The route server can be an existing network component for example one of routers A or B or an additional component as appropriate. The role of the route server is to obtain each border router's eBGP paths for example by polling each of the routers or receiving notification therefrom. The route server can then advertise backup routes with additional implementation information as appropriate and as described above. The route server may carry out additional route selection steps itself in order to identify which routes it should advertise to which router, or may propagate all routes and allow the decision to be made locally as appropriate.

It will be noted that once the available paths have been distributed amongst the border routers then the paths can be selected and implemented in any appropriate manner, for example using the approaches as described with reference to FIGS. 3 and 4, modified as required. Similarly border routers when advertising potential candidate backup paths can incorporate appropriate information allowing selection to take place.

It will be appreciated that whilst the various approaches described above are particularly appropriate where a per-prefix backup route strategy is required, they can be equally implemented in the case of the topology shown in FIG. 1 where multiple links to a common AS provide redundancy. In that case, for example, the availability of backup routes can be inferred generally from the presence of an advertisement (equivalent to or comprising AS PATH assuming that the backup routes are common to all prefixes) or information concerning the specific AS advertising the prefixes can be derived from advertisements as appropriate allowing construction of a backup path to the downstream AS.

As a result of the approaches described above, it will be seen that a solution is provided which is applicable in both directions of the inter domain link and without requiring co-operation with BGP routers outside an AS, packet encapsulation and decapsulation being performed in the same AS. In addition SRLG's are accommodated as well as varying BGP policies through multiple domains or in complex peer agreements.

The approaches discussed above center around the implementation of pe-se tunnels, that is to say, tunnels within a single AS as a result of which co-operation with remote AS's is not required which can be complex in view of the commercial agreements that may affect peering between AS's. In addition a pe-se tunnel may be implemented in relation to a configuration of the type shown in FIG. 6 which is a network diagram showing a further network topology. In particular the topology shown includes a multi-homed stub AS 600 as described in more detail below.

The multi-homed stub AS 600 is attached to transit providers AS1, reference numeral 602, AS2, reference numeral 604 and AS3, reference numeral 606. Stub AS 600 includes routers C, reference numeral 608 and D reference numeral 610. Router C is connected to a router A reference numeral 612 in AS1 via a link 614. Router D is connected to a router B, reference numeral 616 via a link 618. Router D is further connected to a router C via reference numeral 620 in AS3 via a link 622. In particular two possible scenarios can occur in such a network. In a first scenario, the stub AS 600 needs to protect its outgoing packet flow. In this case as the stub can reach all destinations, for example as shown by reference number 624, via all of its transit provider 602, 604, 606, similar problems to those arising with the topologies of FIGS. 1 and 2 are addressed incorporating pe-se tunnels. In the second scenario, however, the stub AS 600 protects incoming traffic which requires a primary egress-secondary ingress (pe-si) protection tunnel.

In the case, first, of traffic from the stub AS 600, then as the providers AS1, AS2, AS3 all provide routes to all destinations 624, a similar approach to that adopted above with reference to FIG. 1 is implemented. In particular the path selection approach described with reference to FIG. 3 can be implemented where eBGP session types are defined appropriately and the other attributes are advertised accordingly. Thus, for example, where node C requires a backup route for a destination X (not shown) in 624 other than via node A in AS1, it may receive an appropriate notification from router D in stub AS 600 that the same destination is served over either, or the best of, links 618 and 622 to AS2 and AS3 respectively.

It will further be appreciated that, where some prefixes are served by certain provider AS's and others by other provider AS the stub AS 600 may implement backup routes on a per-prefix basis as described with reference to FIG. 2 above using any of the techniques set out in detail above in an exactly parallel manner.

In the second scenario it is desirable, at the stub AS 600, to recover provider-stub packet flow when an inter domain link to a stub fails, using a pe-si protection tunnel established between the primary egress router located inside a provider and a secondary ingress router inside the stub. Referring to the network shown in FIG. 6, for example, where the stub AS 600 needs to set up protection tunnels for incoming traffic for example from router A in AS1 upon failure of link 614, it requires such traffic for example to be tunneled to router D in the stub AS via either router B in AS2 or router C in AS3. By treating router A in AS1 as the primary egress router and router D in the stub AS as the secondary ingress router, the routers of the secondary providers AS2 or AS3, although in the backup path, are not involved in either the activation of protection tunnels nor in the de-capsulation of the packets reducing the number of inter AS transactions required to set up the protection scheme. Hence, specific peering negotiations are only required between the AS's involved and appropriate security policies can more simply be put in place.

In order to implement the protection scheme, therefore, an appropriate secondary ingress router to the stub AS 600 must be configured on the primary egress router, router A in the present example. This may be done manually but in an optimization the system is automatically pre-configured. In particular each ingress router in the stub AS, such as each of routers C and D acting as primary ingress routers, advertises over the eBGP session with its respective primary egress router A or B and C the secondary ingress routers inside the stub that could be used as candidate end points for pe-si protection tunnels—in this case the other of routers C and D respectively, indicating as NLRI the IP address of the candidate end point together with the appropriate tunnel attribute including tunnel type and parameters, and for example SRLG information and policy information. In addition the "NO-ADVERTISE" community may be specified ensuring that router A does not propagate the received backup route. Of course the primary egress router must be able to reach the secondary ingress router even if, in normal operation, the primary egress router would have reached all destinations advertised by the stub via the primary ingress router.

Figure 6:
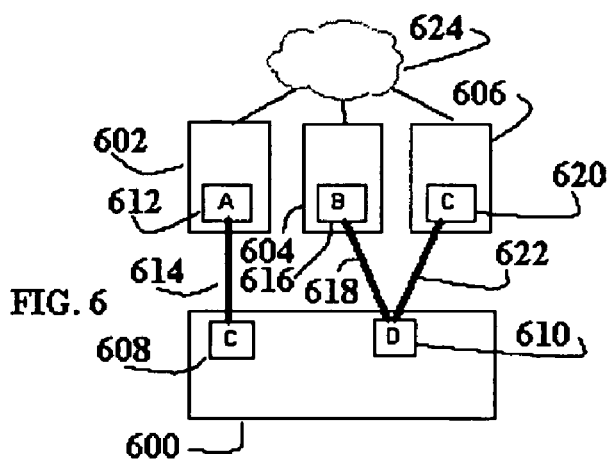
FIG. 6 is a representation of a third multiple domain network to which the method is applied.

So, in the case of FIG. 6, router A must be able to reach router D via an alternate route even if, in normal operation, router A would reach router D via router C. This can be achieved, for example, by identifying the secondary provider for any pe-si tunnel identified and ensuring that the si router is available via the second provider.

The manner in which the primary ingress router, for example router A, identifies protection routes, i.e. candidate secondary ingress routers, may be by filtering protection routes received in the manner described above via iBGP and advertising those routes which have the same eBGP session type and different SRLG values as discussed in more detail above. Router A then selects from amongst the protection routes received over the eBGP session, the optimum end point for the pe-si protection tunnel—for example using the approaches described above.

Figure 7:
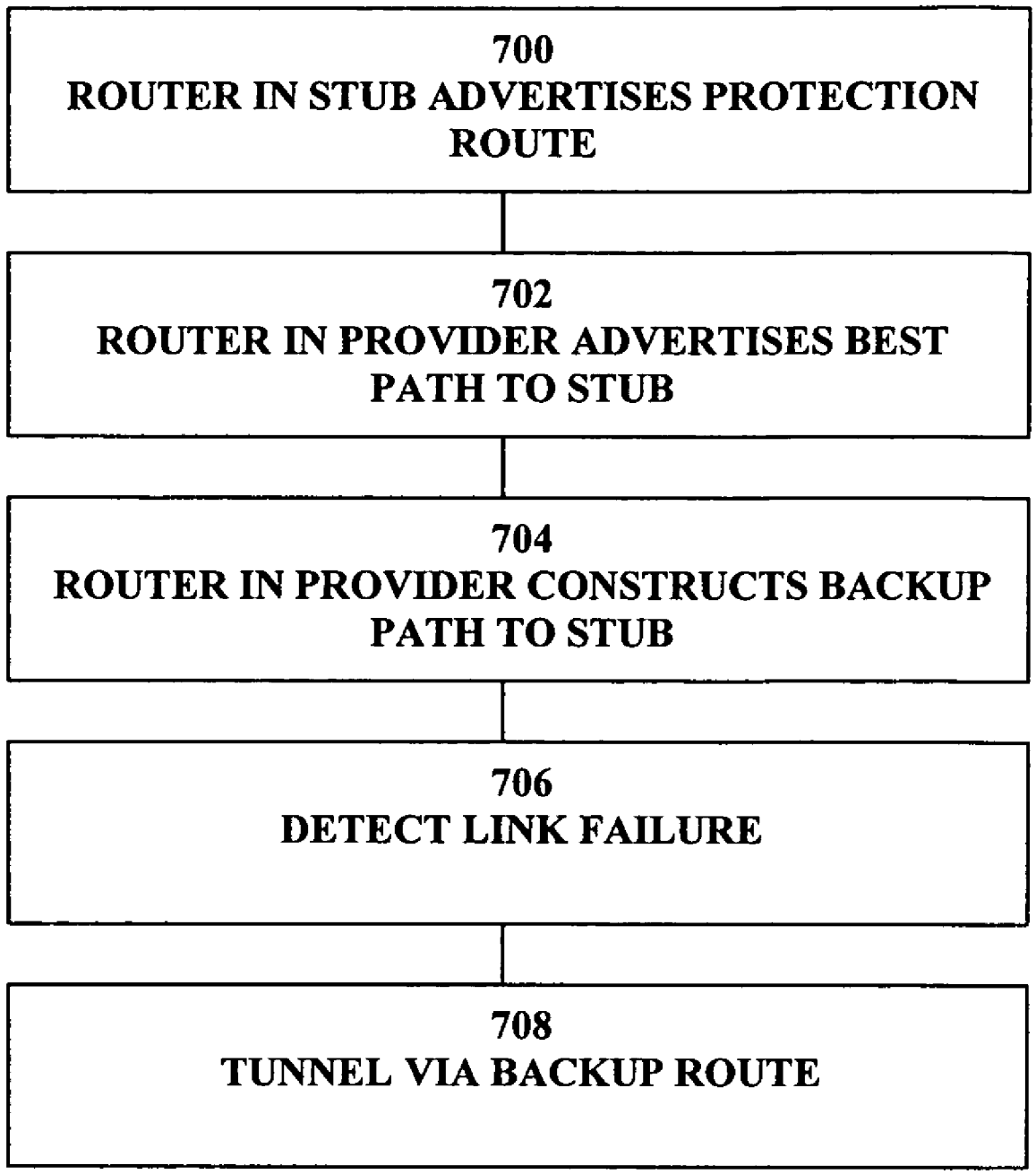
FIG. 7 is a flow diagram illustrating steps performed in instructing a backup path according to a further implementation.

FIG. 7 is a flow diagram illustrating a first alternate implementation of the approach. At step 700 a router in the stub AS 600, for example router C, advertises to router A in AS1 a protection route including the destinations at the stub as NLRI, itself as nexthop, an AS path identifier (for example AS4, treating the stub AS as having that name) and a backup path identifier field or protection route attribute comprising an identifier for a secondary egress router from which the destinations in the stub can also be reached. This protection route attribute can be constructed for example based on a local policy. At step 702 router A advertises in AS1 its best route for those destinations via iBGP as being via router C and via the corresponding AS path 604. At step 704 router A further builds a protection route backup entry for the stub using the information in the protection route attribute and including the forwarding instruction "encapsulate towards backup router" for example router D in FIG. 6. Accordingly, when at step 706 link failure is detected then at step 708 router A tunnels packets to router D.

Figure 8:
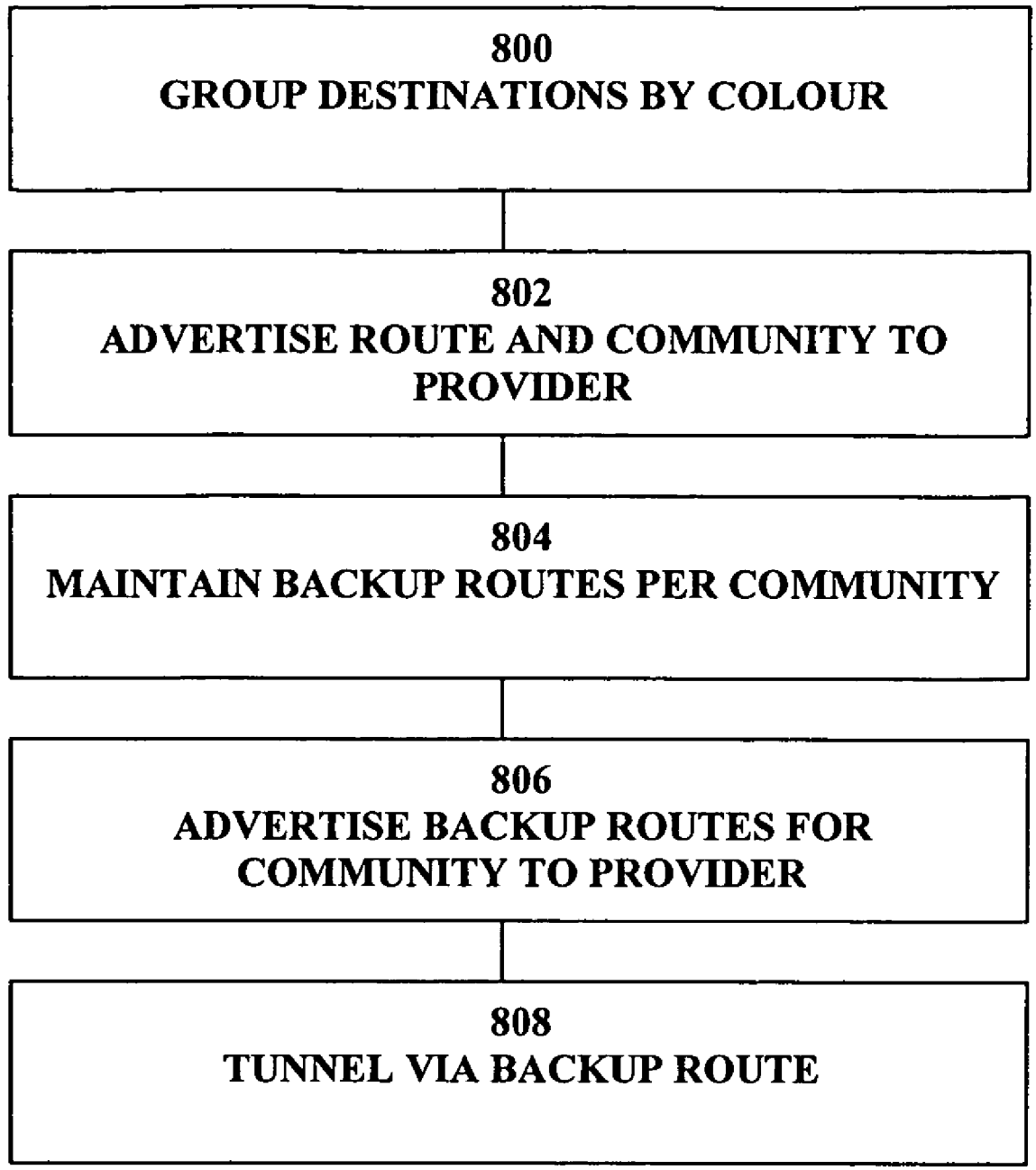
FIG. 8 is a flow diagram illustrating steps formed in constructing a backup path according to further implementation.

FIG. 8 is a flow diagram illustrating a second alternate implementation of the approach. At step 800 the stub AS groups destinations to which routing decisions can be applied via appropriate group identifiers such as BGP communities which are identified here, for the purposes of explanation only, as different colours. At step 802 each of the stub AS routers C and D advertise their routes to external AS's including the associated communities. Then, at step 804, backup destination addresses for each community are identified and stored. For example each router in the stub AS 600 may advertise within the AS the identity of AS's to which each community has been advertised. These advertisements may be received at each other router in the stub AS or at an additional AS component configured to identify which other provider AS's have received an advertisement for the same community. Then, at step 806 each stub router advertises to external AS any backup routes for each community which it advertised to that AS. For example where the stub AS has advertised a first community comprising a "blue" set of destinations to AS1 and AS3 in FIG. 6, then node C can advertise to node A that that community may be served by router E in AS3 and router D in the stub AS whilst router D in the stub AS advertises to router E in AS3 that the community is served by router A in AS1 and router C in the stub AS. Then, at step 808, upon detection of a failure at router A packets previously destined for router C via link 614 are tunneled via the backup route for the community as appropriate.

It will be appreciated that any specific tunneling technique may, as described above, be adopted as appropriate and that appropriate protection mechanisms such as protection bits or forwarding helpers may be used to the extent permissible between peer AS's. Where a repaired packet is forwarded into a pe-si tunnel then the encapsulation will occur at the primary egress node and the packet will be finally decapsulated at the secondary ingress node. As the primary ingress node and secondary ingress node are in a common AS then appropriate steps post decapsulation can be implemented at the secondary ingress node according to a common policy across the AS. In addition appropriate security policies can be implemented by the primary ingress router. As a result of the arrangement described, no mutual co-operation between provider AS's is required, but only between each provider and the stub, reducing the number of inter-domain peer agreements required. Indeed appropriate security measures can similarly be implemented as for pe-se tunnels, that is inter domain tunnels for example using appropriate access control lists or generic tunneling security mechanisms.

Once activated, protection tunnels provide fast repair albeit via a non-optimal backup route and using tunnel implementations which can in some cases increase the forwarding or processing burden on routers in the network. Accordingly it is desirable to maintain the tunnel only until convergence has taken place. In addition it will be noted that the failure will also be advertised via iBGP which in turn will give rise to the update of all the FIB's of the routers in the AS which can also result in a risk of packet loss or looping. In particular a router in the AS whose inter domain link fails will send a withdraw message whilst the backup router will send an update message indicating its own alternate routes and the ordering of processing of the messengers and in many cases give rise to loops. Accordingly it is desirable to ensure that all destinations reached via the protection tunnel must remain reachable during the entire routing conversion and that no transient packet forwarding loops are caused by the update of the FIB's of the routers inside the AS.

As a first step, a router can be configured with a policy indicating that, upon failure of a protected link a Timer T should be set during which time all traffic normally forwarded on the link should be encapsulated into a tunnel with destination address of the alternate route. The value of Timer T can set be at an appropriate duration to allow normal BGP convergence to occur such that the router will stop protecting the traffic and in particular tunneling it once timer T expires. For example the value of timer T might be in the region of 10 to 50 seconds. However additional steps may be required to avoid looping.

The manner in which convergence is treated according to these additional steps is dependent upon the forwarding mechanism in place in the network. In the case of a network providing BGP/MPLS VPN, where iBGP is used to distribute VPN routes to the provider edge (PE) routers a VPN route is considered as an opaque bit string by the BGP routers that distribute the routes. As discussed above, the service provider, for example AS1 or AS2 in FIG. 1, configures each of its edge or PE routers to use a unique RD for each PE-CE link (e.g. link AC 614). As a result each router in the AS receives, via iBGP, all the VPN routes for the prefixes or destinations that are reachable over the PE-CE links. Because the VPN route is opaque to distributing BGP routers, this approach is appropriate even if the service provider network is divided into sub-autonomous systems or confederations, or uses BGP route reflectors. Accordingly when a PE router subsequently sends a BGP withdraw message due to the failure of a link, the messages will reach other PE routers with available alternate VPN routes, with a different RD which can then implement the alternative routes. As, in BGP/MPLS VPN, the alternate route uses tunnels, for example MPLS or IP tunnels, the alternate route will be loop free.

Figure 9:
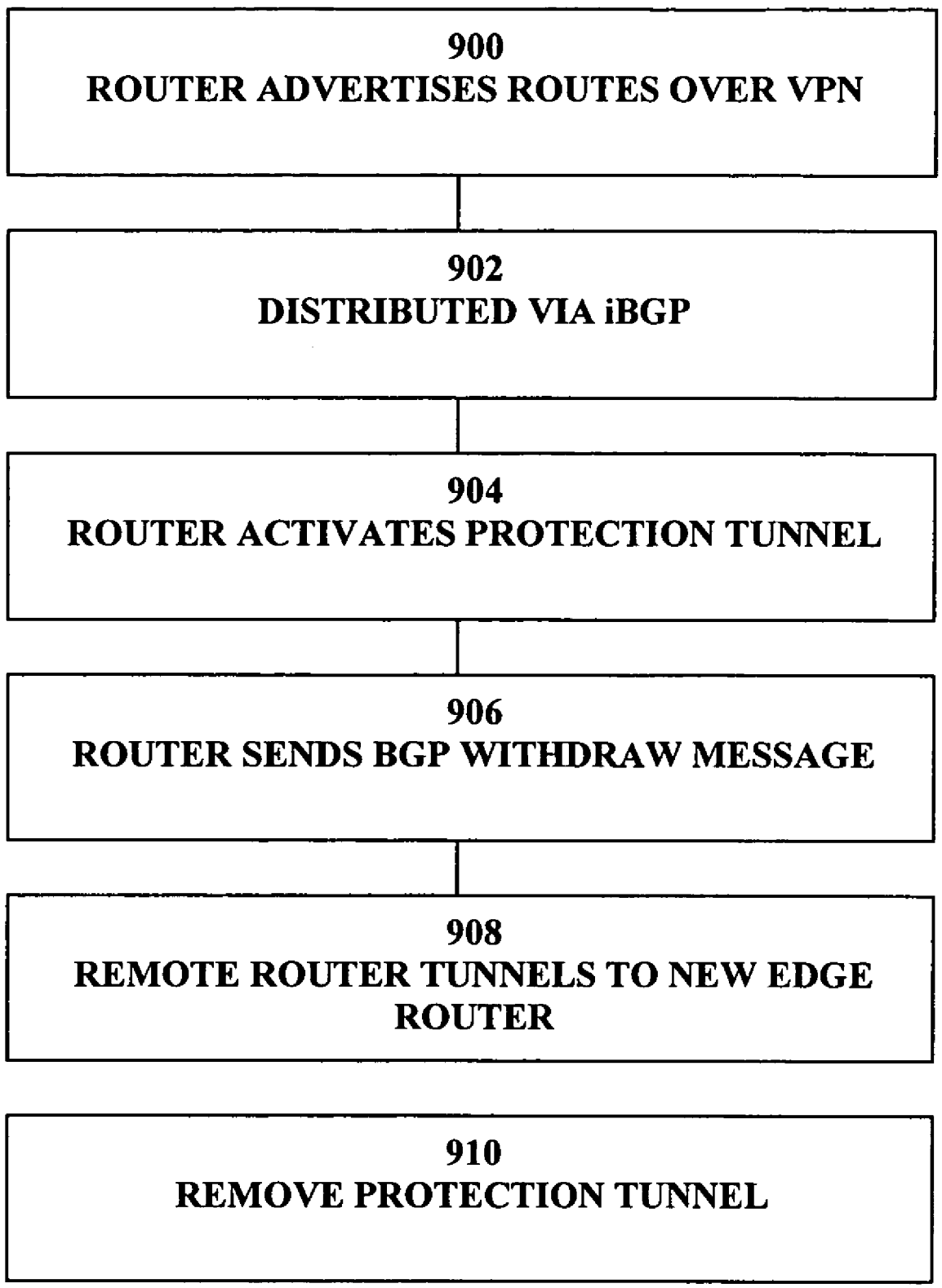
FIG. 9 is a flow diagram illustrating steps performed in deactivating a backup path.

The approach can be further understood with reference to the network shown in FIG. 1 in conjunction with FIG. 9 which is a flow diagram illustrating the steps involved in more detail. A router, for example, router A, at step 900, advertises the prefixes which it can reach over link 110 together with an RD and the routes are distributed via iBGP to other routers in the AS belonging to the VPN, for example router B such that all available routes are distributed rather than the best routes only as in the case of a normal iBGP notification. In addition route reflectors will distribute all of the routes in this opaque format.

Upon failure of link 110 router A activates its protection tunnel at step 904 and then, at step 906, sends a BGP withdraw message. At this stage, router A tunnels packets to router B and on to AS2 via link 112. Following normal operation in a BGP/MPLS VPN, prior to receipt of the BGP withdraw message, each other router in the AS acting as ingress router forwards the VPN traffic to the appropriate egress border routers using MPLS tunnels such that a further router, for example router E, reference 116 uses an MPLS tunnel to send, via router A, packets to AS2. However once the router E receives the BGP withdraw message from router A it will have the alternate route which has been distributed as a VPN route over iBGP and will immediately switch at step 908 to MPLS tunneling to router B. Then, at step 910, router A can remove its protection tunnel for example on expiry of timer T allowing convergence to take place as discussed above. It will be appreciated that whilst the above discussion is directed to a BGP/MPLS VPN, it can equally apply to VPN's using other tunneling mechanisms such as IP tunneling between VPN sites.

Tunnel deactivation can also be implemented without loops in an AS using encapsulation between edge routers. Referring, for example, to FIG. 1, once again AS1, reference numeral 100, includes border routers A, B and a further border router E, reference numeral 116. In this case, packets arriving at the AS at router E as BGP ingress router and destined for a prefix served, for example, by AS2 are tunneled across the AS for the correct BGP egress router, for example router A.

In particular the ingress border router E consults its BGP routing table to forward such a "transit packet" and identifies router A as providing the best eBGP path to AS2. The transit packet is then encapsulated at router E destined for router A and forwarded across the AS relying on IGP forwarding such that no other router inside the AS will consult its BGP routing table to forward the packet. As a result, within the AS, as IGP is loop free, transient loops can be avoided during normal operation. The encapsulation can be implemented in various ways. For example in MPLS a top label is attached ensuring the packet reaches the egress route border router A and a bottom label indicates the inter domain link (link AC 110) to be used by the router B to reach the nexthop once the top label has been stripped off. In IP tunneling, the packet is double encapsulated with a first IP header having the address of the egress border router A and an inner tunnel heading indicating the inter domain link once the packet has been decapsulated at router B.

Figure 10:
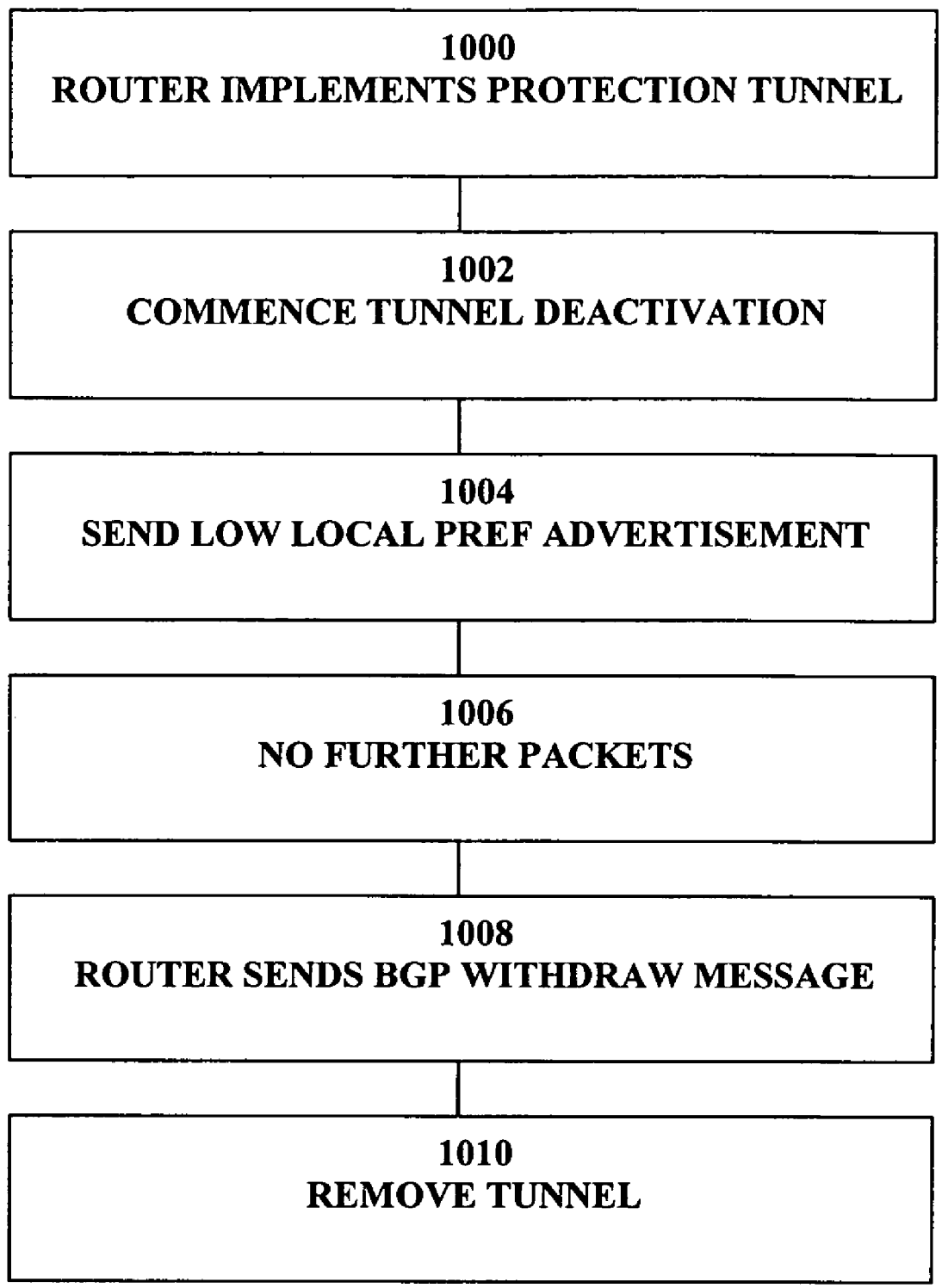
FIG. 10 is a flow diagram illustrating steps performed in deactivating a backup path according to an alternative implementation.

While failed link 110 is protected then router A, for example, will be tunneling its protection packets to router B over a pe-se tunnel according to any of the methods described above. Once again, however, it is desirable to remove the tunnel once it is no longer needed, and to ensure that no loops occur at this stage. The approach adopted can be understood with reference to FIG. 10 which is a flow diagram illustrating the steps performed according to the method. At step 1000 router A has implemented its protection tunnel on failure of link AC as described in more detail above and is tunneling packets which previously would have gone over link AC to router B which will forward the packets over link BD. At step 1002 router A identifies that the process for removing the tunnels should be commenced, for example on expiry of a timer of the type described above set to a period exceeding the expected time for BGP convergence.

It will be noted that at this stage, all other border routers in the AS will be tunneling packets for link AC to router A which will then be implementing its own tunnel and that mere immediate removal of the tunnel could give rise to loop problems as described above. Accordingly router A sends a BGP message effectively indicating that destinations reached via the pe-se tunnel will soon become unreachable. In particular an iBGP advertisement is sent by router A attributing a low local-pref (local preference) value to the route for example a value of zero which is considered as the worst route by the standard BGP decision process. As a result the route will not be removed from the RIB's of the other BGP routers such that the prefixes will remain reachable albeit at a low preference. Accordingly when a router, for example router E receives the iBGP message it may modify its FIB and select a new BGP nexthop (and thus a new tunnel) to reach the destination, for example router B. As the transit packet will be tunneled to the new BGP nexthop a loop will not occur as the IGP routing tables are assumed to be stable and loop free. Upon decapsulation of the packet at router B it will be forwarded along link BD as described in more detail above. For a transition period while the BGP border routers update their FIB's some packets may continue to be tunneled to router A which will then simply tunnel using the pe-se tunnel which has not yet been removed. However the border routers will eventually converge in iBGP on the new path which will have been separately advertised by router B. Once router A identifies at step 1006 that no further packets are using the pe-se protection tunnel to router B then, at step 1008, it sends its BGP withdraw message and at step 1010 removes the tunnel.

It will be seen that as a result of the approaches described above a fast protection mechanism is provided for inter domain links using existing forwarding mechanisms with appropriate modifications. In addition, the protection mechanisms can be removed when no longer required in appropriate manners ensuring that loops do not arise during this process.

It will be appreciated that the approaches described herein can be implemented in any appropriate manner and on any appropriate platform, and the various steps described implemented in any appropriate manner in hardware or software.

4.0 IMPLEMENTATION MECHANISMS—HARDWARE OVERVIEW

Figure 11:
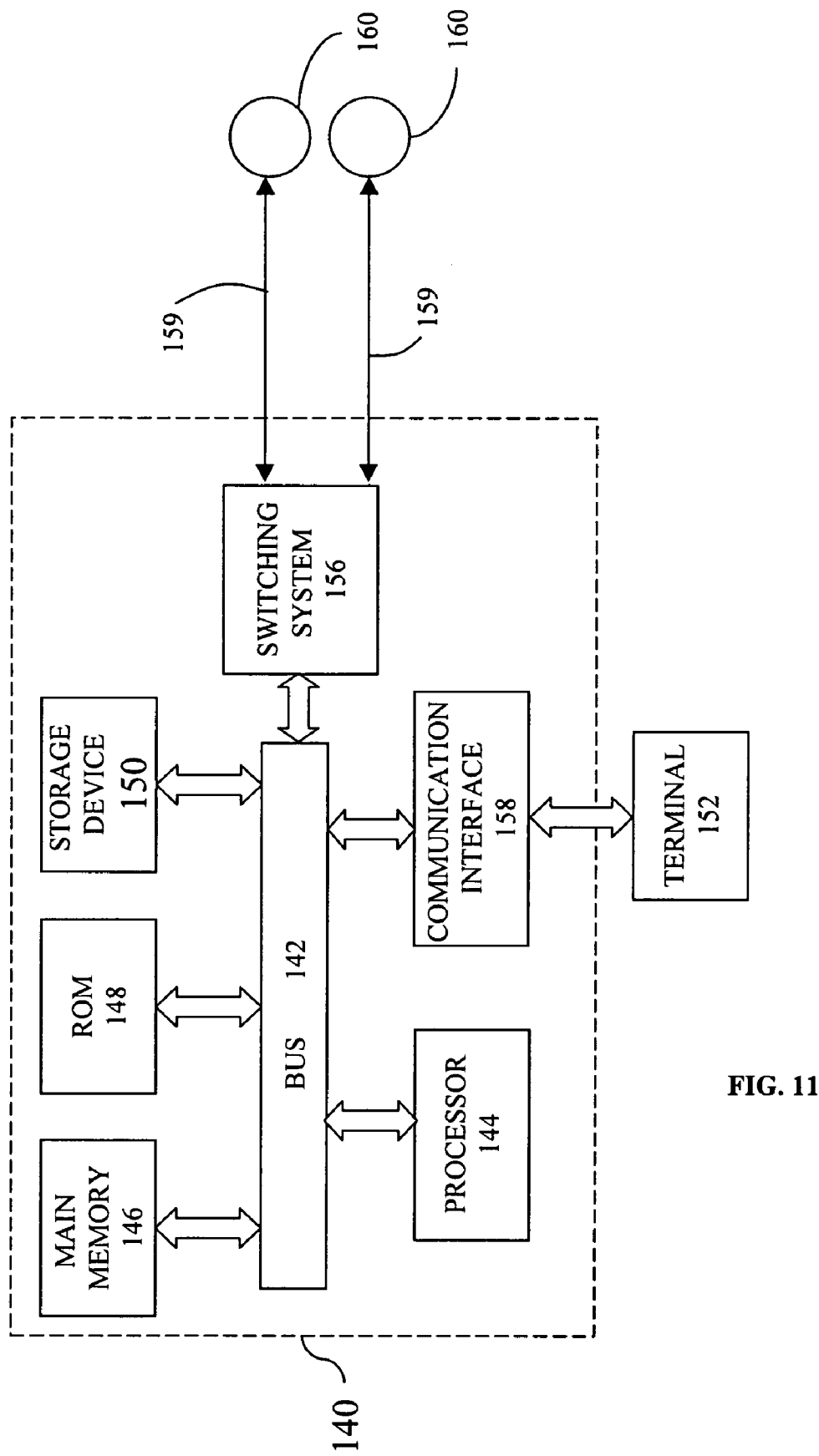
FIG. 11 is a block diagram that illustrates a computer system on which the method of constructing a BGP repair route may be implemented.

FIG. 11 is a block diagram that illustrates a computer system 140 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router the above described method. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Aspect or examples or embodiments described can be juxtaposed or interchanged as appropriate.

It will be appreciated that any appropriate BGP and IGP mechanism can be adopted and that tunneling can be implemented in any appropriate manner, for example using MPLS or IP tunnels. It will further be appreciated that any appropriate VPN approach can be implemented. Although discussion is directed to single EBGP sessions per interface, multiple access interfaces can also be accommodated as appropriate for example operating on the basis of per BGP peer rather than per interface. In the case of VPN implementation an RD can be configured for each individual peer in that case.

The invention claimed is:

1. A method, comprising:
constructing, at a first border router of a first autonomous system (AS), a primary route to a remote AS;
constructing, at the first border router, an alternate route to the remote AS via a second border router in the first AS;
instigating a backup tunnel from the first border router in the first AS to the second border router in the first AS for use by the alternate route, upon failure of an inter-area link used by the primary route from the first AS to the remote AS; and
sending a failure message to one or more other border routers of the first AS to cause the one or more other border routers to forward traffic to the second border router in the first AS.

2. The method as in claim 1, wherein the border routers in the first AS comprise a Virtual Private Network (VPN).

3. The method as in claim 2, wherein the VPN comprises a Border Gateway Protocol (BGP)/Multi-Protocol Label Switching (MPLS) VPN and the primary route comprises an MPLS tunnel.

4. The method as in claim 2, further comprising:
learning the alternate route at the first border router via a VPN route advertisement.

5. The method as in claim 4, wherein the VPN route advertisement comprises a corresponding route distinguisher.

6. The method as in claim 1, wherein the failure message comprises a withdrawal message.

7. The method as in claim 1, further comprising:
tunneling data for the second AS from a third border router in the first AS to the second border router using a second backup tunnel upon receipt of the failure message.

8. The method as in claim 1, further comprising:
removing the backup tunnel upon expiration of a convergence period.

9. The method as claim 1, wherein the primary route comprises one of an Internet Protocol (IP) tunnel and a Multi-Protocol Label Switching (MPLS) tunnel.

10. The method as in claim 1, further comprising:
detecting failure of the primary route;
setting the primary route to a low preference value; and
advertising the low preference value in the failure message.

11. The method as in claim 1, further comprising:
receiving the advertisement at the one or more other border routers;
deriving an alternate route at the one or more other border routers; and
forwarding data elements previously destined for the primary route to the derived alternate route using a second backup tunnel.

12. The method as in claim 1, further comprising:
determining that the first border router no longer receives data elements for the primary route; and in response removing the backup tunnel.

13. The method as in claim 1, wherein the border routers of the first AS communicate with one or more border routers of the remote AS using an exterior communications protocol, and wherein the border routers of the first AS communicate with one another using an interior communications protocol.

14. A method, comprising:
communicating between a plurality of border routers in a first autonomous system (AS) using primary tunnels;
communicating from the plurality of border routers to one or more remote ASes using inter-domain links from the border routers;
forwarding data elements for a primary inter-AS route from a first border router to a second border router in the first AS;
receiving a failure message advertisement from the second border router in relation to the primary inter-AS route;
deriving an alternate inter-AS route; and
forwarding data elements previously destined for the primary inter-AS route to the derived alternate inter-AS route using a primary tunnel in the first AS in response to an inter-area link failure used by the primary inter-AS route.

15. Software encoded in one or more volatile or non-volatile non-transitory computer-readable media and when executed operable to:
construct, at a first border router of a first autonomous system (AS), a primary route to a remote AS;
construct, at the first border router, an alternate route to the remote AS via a second border router in the first AS;
instigate a backup tunnel from the first border router in the first AS to the second border router in the first AS for use by the alternate route, upon a failure of an inter-area link used by the primary route from the first AS to the remote AS; and
send a failure message to one or more other border routers of the first AS to cause the one or more other border routers to forward traffic to the second border router in the first AS.

16. An apparatus, comprising:
means for constructing, at a first border router of a first autonomous system (AS), a primary route to a remote AS;
means for constructing, at the first border router, an alternate route to the remote AS via a second border router in the first AS;

means for instigating a backup tunnel from the first border router in the first AS to the second border router in the first AS for use by the alternate route, upon a failure of an inter-area link used by the primary route from the first AS to the remote AS; and means for sending a failure message to one or more other border routers of the first AS to cause the one or more other border routers to forward traffic to the second border router in the first AS.

17. An apparatus, comprising:

one or more processors;

a network interface communicatively coupled to the one or more processors and configured to communicate one or more packet flows among the one or more processors in a network; and a memory adapted to store one or more sequences of instructions that when executed are operable to i) construct, at a first border router of a first autonomous system (AS), a primary route to a remote AS, ii) construct, at the first border router, an alternate route to the remote AS via a second border router in the first AS, iii) instigate a backup tunnel from the first border router in the first AS to the second border router in the first AS for use by the alternate route, upon a failure of an inter-area link used by the primary route from the first AS to the remote AS, and iv) send a failure message to one or more other border routers of the first AS to cause the one or more other border routers to forward traffic to the second border router in the first AS.

* * * * *